US006850048B2

(12) United States Patent (10) Patent No.: US 6,850,048 B2
Orr et al. (45) Date of Patent: Feb. 1, 2005

(54) POWER SUPPLY CONTROLLER (75) Inventors: Raymond Kenneth Orr, Kanata (CA); Yan-Fei Liu, Kanata (CA); Roger Peter Colbeck, Stittsville (CA); David Alan Brown, Carp (CA); Hartley Fred Horwitz, Ottawa (CA)

(73) Assignee: Potentia Semiconductor, Inc., Kanata (CA)

( * ) Notice: Subject to any disclaimer, the term of this patent is extended or adjusted under 35 U.S.C. 154(b) by 0 days.

(21) Appl. No.: 10/428,095

(22) Filed: May 2, 2003

(65) Prior Publication Data

US 2004/0217749 A1 Nov. 4, 2004

(51) Int. Cl.[7] .............................. G05F 5/00; G06F 1/26
(52) U.S. Cl. ..................................... 323/299; 713/330
(58) Field of Search ................................ 323/299, 301, 323/303; 713/310, 330, 340; 307/18, 24, 29, 31, 51, 52, 80, 85

(56) References Cited

U.S. PATENT DOCUMENTS

| 4,323,789 A | * | 4/1982 | Dion ........................... 307/81 |
| 5,878,264 A | * | 3/1999 | Ebrahim ..................... 713/323 |
| 5,963,438 A | | 10/1999 | Chen ............................ 363/21 |
| 6,125,440 A | * | 9/2000 | Osovets ....................... 712/205 |
| 6,237,103 B1 | * | 5/2001 | Lam et al. ................... 713/330 |
| 6,333,650 B1 | | 12/2001 | Amin et al. |
| 6,348,744 B1 | | 2/2002 | Levesque ..................... 307/86 |
| 6,429,706 B1 | | 8/2002 | Amin et al. |
| 6,563,718 B1 | | 5/2003 | Li et al. ....................... 363/16 |
| 6,671,816 B1 | * | 12/2003 | Woo ............................. 713/330 |

FOREIGN PATENT DOCUMENTS

| DE | 10122461 A1 | 5/2001 | .......... H02M/3/337 |
| JP | 04212528 | 1/1991 | .......... H04B/3/56 |
| JP | 04322140 | 4/1991 | .......... H02J/13/00 |
| JP | 08005693 | 1/1996 | .......... G01R/31/00 |
| JP | 11252919 | 2/1998 | .......... H02M/3/28 |
| JP | 2003/348837 | 5/2002 | .......... H02M/3/28 |

OTHER PUBLICATIONS

Modular Solid–State Power Sequencing, Goodew et al., IBM Technical disclosure Bullevin vol. 15, No. 12, pp. 3697–3699, May 1973.
"LTC1645 Dual–Channel Hot Swap Controller/Power Sequencer", Linear Technology Corporation, 1999.
"Power Supply Sequencing Solutions for Dual Supply Voltage DSPs", Texas Instruments Application Report, SLVA073A, Jul. 2000.
"Power–supply Sequencing for low–voltage processors", B. Bush, EDN, Sep. 1, 2000.
"Modular Solid–State Power Sequencing"; IBM Technical Disclosure Bulletin; XP–002292120; vol. 15; No. 12; May 1973; pp. 3697–3699.
"Dara Processing System Power Controller"; IBM Technical Disclosure Bulletin; XP–002292121; vol. 23; No. 7A; Dec. 1980; pp. 2651–2652.
"Individual I/O Sequence Control"; IBM Technical Disclosure Bulletin; XP –000714872; vol. 27; No. 12; May 1985; pp. 6862–6863.

* cited by examiner

Primary Examiner—Matthew V. Nguyen (57) ABSTRACT

A power supply controller controls power supplies for power-up and/or shut-down in a desired sequence. An input voltage for the power supplies powers, and is monitored by, a first control unit having outputs for enabling the power supplies. A second control unit monitors output voltages of the power supplies, and an isolating signal coupler couples signals in both directions between the first and second control units. The second control unit is powered in an isolated manner from the input voltage, conveniently via a transformer constituting the signal coupler. The control units together respond to the monitored voltages for enabling the power supplies in accordance with the desired sequence, information for which can be stored in a non-volatile store. The second control unit can also include enable outputs isolated from the input voltage, and trim outputs for adjusting the monitored voltages.

27 Claims, 4 Drawing Sheets

POWER SUPPLY CONTROLLER

This invention relates to a power supply controller, and is particularly concerned with a power supply controller for controlling a plurality of power supplies. The term "power supply" is used herein to refer to any type of device for supplying controlled electrical power for a load. For example, the power supplies may comprise isolating or non-isolating switch mode, power supplies or DC power converters, and voltage regulator modules.

REFERENCE TO RELATED APPLICATIONS

Reference is directed to the following copending United States Patent Applications filed simultaneously herewith, the entire disclosure of each of which is hereby incorporated herein by reference:

"Sequencing Power Supplies", D. Brown et al., (79115-20, PP011);

"Signal And Power Transformer Coupling Arrangements", R. Orr et al., (79115–4, PP005);

"Coupling Signals Via A Coupling Arrangement", D. Brown et al., (79115–16, PP014);

"Transformer Coupling Arrangement And Method Using A Plurality Of Drivers", D. Brown, (79115-17, PP016).

BACKGROUND

In electronic equipment, it is known to provide a plurality of power supplies for supplying various electrical loads (parts of the equipment) with different supply voltages. For example, the equipment may comprise communications or computing equipment in the form of circuit cards which are inserted into card slots in an equipment rack and are connected to, and interconnected by, a backplane. The equipment rack or an equipment frame may include one or more power sources which provide power to the circuit cards, for example in the form of a (nominally) 48-volt supply.

On each circuit card, this 48-volt input supply voltage may be converted into a plurality of individual supply voltages for different parts of the equipment on the card, by respective power supplies. For thermal and efficiency reasons, each power supply may be a switch mode power supply (SMPS) or DC power converter, but other forms of power supply, such as voltage regulator modules (VRMs), may also be provided. For example, the individual supply voltages may range from 1.5 volts or less to 5 volts or more. Each SMPS may conveniently, but need not necessarily, provide electrical isolation of its output voltage from the input supply voltage.

The various parts of the electrical equipment on such a circuit card increasingly may require that the individual supply voltages be applied and removed in a particular sequence or manner to avoid any possible damage to the equipment. In addition, monitoring of the individual supply voltages is generally required in order to ensure proper operation of the equipment and to detect power supply faults. Accordingly, it is known to provide a power supply controller or sequencer which performs these functions for the plurality of power supplies.

For example, one such power supply controller is known from "Modular Solid-State Power Sequencing", Goodew et al., IBM Technical Disclosure Bulletin Vol. 15, No. 12, pages 3697–3699, May 1973. Another power supply controller, for two power supply channels or voltages, is provided by the LTC®1645 integrated circuit device as described in "LTC1645 Dual-Channel Hot Swap Controller/Power Sequencer", Linear Technology Corporation, 1999. The latter device is intended to facilitate safe circuit card insertion in and removal from a live backplane, this being referred to as hot swapping of the circuit card.

However, hot swapping of circuit cards presents potential problems which are not addressed by the above controllers. For example, on insertion of a circuit card into a live backplane, to avoid undesired states (e.g. latch-up) of parts of the equipment on the circuit card it may be advantageous or necessary for a power supply controller on the circuit card to be powered up and operating before the circuit card is completely inserted to make signal connections. This can be facilitated using staggered connectors on the circuit card, but this still requires a rapid start-up of the power supply controller, for example within a few milliseconds.

In particular, it is generally desirable or necessary to ensure that the power supply controller is powered up and operating effectively (e.g. has completed its own start-up processes) to control the power supplies before the power supplies are themselves powered up, even though the power supply controller and the power supplies both derive their operating power from the same source.

In addition, the power supply controllers referred to above are limited in their applications. For example, neither of them is arranged to maintain, in arbitrary power supply arrangements, electrical isolation that may be provided between the input supply voltage and the output voltages of isolating power supplies.

A need exists to provide a power supply controller for controlling relatively arbitrary numbers and types of power supplies from various manufacturers, the power supplies providing various supply voltages from a relatively arbitrary input supply voltage, with any of various sequencing, monitoring, and control functions that may be desired in particular applications.

SUMMARY OF THE INVENTION

According to one aspect of this invention there is provided a power supply controller for controlling a plurality of power supplies each for producing a respective output voltage from an input voltage, the controller comprising: a first control unit arranged for monitoring the input voltage and for controlling the power supplies, the first control unit having a voltage supply derived from the input voltage; a second control unit arranged for monitoring the output voltages of the power supplies, the second control unit having a voltage supply derived in an isolated manner from the input voltage; and an isolating signal coupler for coupling signals, related to the control of the power supplies, in an isolated manner from the second control unit to the first control unit.

In an embodiment of the invention, the voltage supply for the second control unit is derived via the first control unit and the isolating signal coupler. The isolating signal coupler preferably couples signals in an isolated manner in both directions between the first and second control units.

Each of the first and second control units can include outputs for enabling or disabling respective ones of the controlled power supplies, and the second (and optionally the first) control unit can include outputs for adjusting the monitored output voltages of the controlled power supplies.

The power supply controller preferably includes a non-volatile store for storing information relating to controlling the power supplies.

Another aspect of the invention provides a power supply controller for controlling a plurality of controlled power supplies, comprising: a first control unit for monitoring an input voltage of the controlled power supplies and for providing enable outputs for enabling or disabling respective controlled power supplies; a first power supply unit for deriving a power supply voltage for the first control unit from the input voltage; a second control unit for monitoring output voltages of the controlled power supplies; a second power supply unit for deriving a power supply voltage for the second control unit from the input voltage in an electrically isolated manner; and an electrically isolating signal coupler for coupling signals in both directions between the first and second control units; wherein the first and second control units are responsive to the monitored input voltage and the monitored output voltages for controlling the enable outputs to enable or disable the controlled power supplies.

The power supply controller preferably includes a non-volatile store, coupled to the second control unit, for storing information relating to a desired sequence, the first and second control units being responsive to the monitored input voltage and the monitored output voltages for controlling the enable outputs to enable or disable the controlled power supplies in the desired sequence.

A further aspect of the invention provides a power supply controller for controlling a plurality of isolating power supplies, each for converting an input voltage to one or more respective output voltages, for power-up or shut-down in a desired sequence, the power supply controller comprising: a first control unit powered from the input voltage and having outputs for enabling the isolating power supplies via an input on a primary side of each isolating power supply, the first control unit being arranged to monitor the input voltage; a second control unit powered from the input voltage in an isolated manner and arranged to monitor the output voltage of each isolating power supply; and an isolating signal coupler between the first and second control units; the control units together being responsive to the monitored input voltage and the monitored output voltages so that the first control unit enables the isolating power supplies in accordance with the desired power-up or shut-down sequence.

The power supply controller preferably includes a non-volatile store, coupled to the second control unit, for storing information relating to the desired power-up or shutdown sequence, and preferably the control units are responsive to the monitored input voltage and the monitored output voltages to store information relating to detected faults of the monitored voltages in the non-volatile store. Preferably the second control unit and the non-volatile store are powered from the input voltage via the first control unit and the isolating signal coupler.

In an embodiment of this power supply controller the second control unit is also arranged to monitor an output voltage of at least one non-isolating power supply having an input voltage constituted by an output voltage of one of the isolating power supplies, and the second control unit also includes an output for enabling or disabling the non-isolating power supply in accordance with the desired power-up or shutdown sequence.

The invention also provides a power supply arrangement comprising a power supply controller as recited above and a plurality of controlled power supplies arranged to be controlled by the power supply controller, for example on a circuit card for connection to a backplane for receiving the input voltage.

BRIEF DESCRIPTION OF THE DRAWINGS

The invention will be further understood from the following description by way of example with reference to the accompanying drawings, in which.

DETAILED DESCRIPTION

Figure 1:
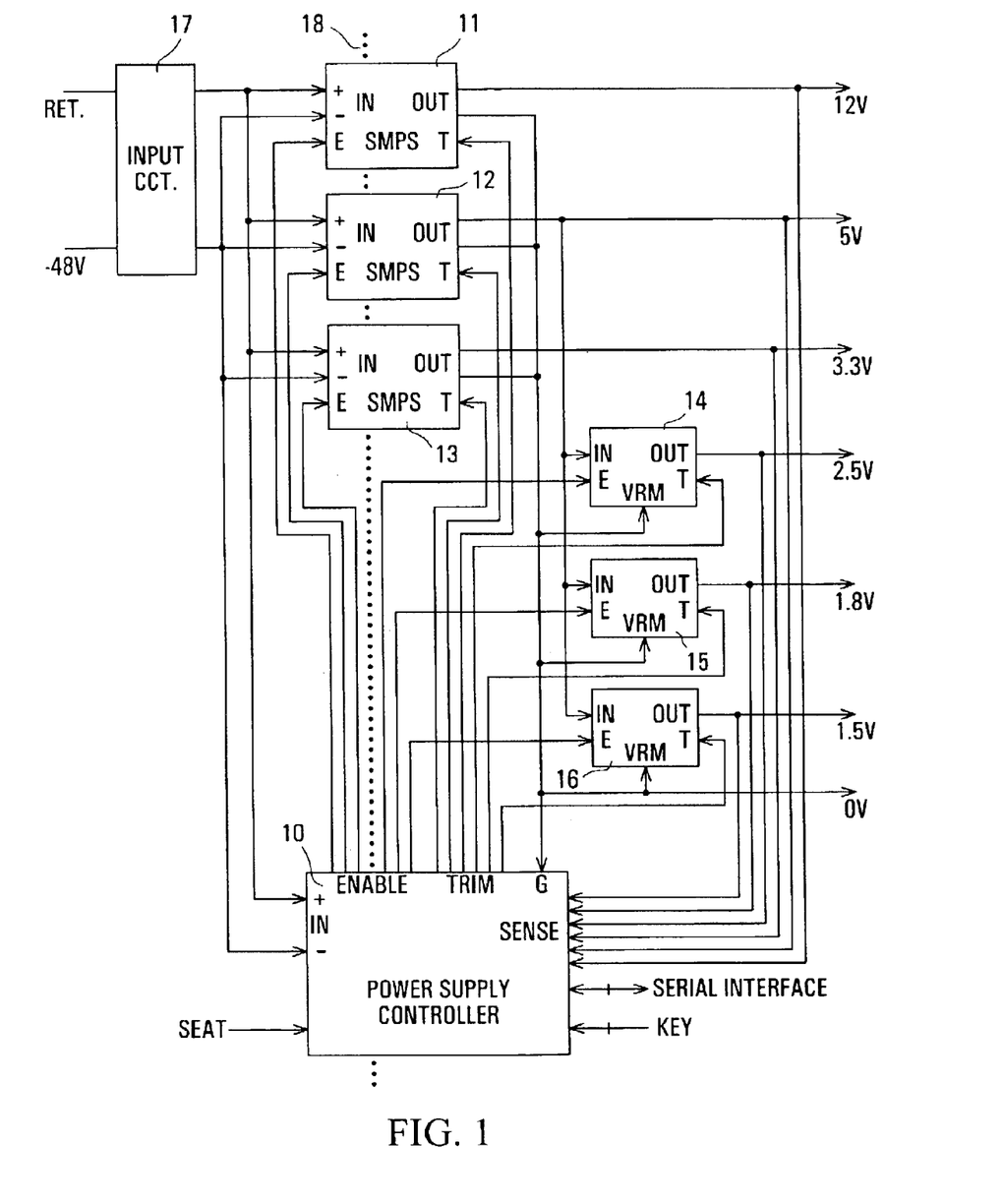
FIG. 1 shows a block diagram of one example of a power supply arrangement including a power supply controller in accordance with an embodiment of the invention.

Referring to FIG. 1, a power supply arrangement is illustrated by way of example as including a power supply controller 10, six power supplies 11 to 16, and an input circuit 17. In this example each of the power supplies 11 to 13 is an isolating switch mode power supply (SMPS), also referred to as a DC converter or a point-of-use power supply or PUPS, and each of the power supplies 14 to 16 is a non-isolating voltage regulator module (VRM). All of the units 10 to 17 are for example provided on a circuit card (not shown), which also includes electrical circuits (not shown) constituting loads to be powered by the power supplies. In use, the circuit card is inserted in an equipment slot and thereby connected to a backplane (not shown) which provides connections of the input circuit 17 to a nominally −48 volt power source and a return line (RET.).

The input circuit 17 for example comprises an inrush current limiter, EMI (electro-magnetic interference) filter, power supply fuses, and possibly diodes providing an OR-circuit for a plurality of power sources provided for reliability, all of which are known and are not further described here. Outputs of the input circuit, constituting a nominally 48 volt input voltage for the power supplies, are connected to positive and negative (+ and −) power supply inputs of the power supply controller 10 and of each SMPS 11 to 13.

The power supply controller 10 optionally includes an input SEAT which has a predetermined state when the circuit card is correctly seated in a backplane socket, and an input KEY, which may comprise a plurality of lines as indicated in conventional manner by a bar on the single line shown in FIG. 1, which has a predetermined state when the circuit card is inserted into a backplane socket intended to receive this circuit card. These inputs, which may for example provide binary signals to the power supply controller 10, enable the power supply controller to determine, before it enables the power supplies 11 to 16, that the circuit card is properly inserted into an appropriate backplane socket.

In normal operation when enabled as described further below, the power supplies 11 to 16 provide respective supply voltages to various electrical circuits on the circuit card. Purely by way of example, in the power supply arrangement of FIG. 1 the power supplies 11 to 16 are illustrated as providing respective supply voltages of 12, 5, 3.3, 2.5, 1.8, and 1.5 volts relative to a ground or 0V line which is also connected to a ground connection G of the power supply controller 10. In this example the three higher supply voltages are provided by the SMPSs 11 to 13, and the three lower supply voltages are provided by the VRMs 14 to 16, whose supply voltage inputs are connected to the 5 volt output of the SMPS 12. It can be appreciated that the number, arrangement, input and output voltages, and connections of the power supplies in the arrangement of FIG. 1 are only given by way of example and may all be changed. In addition, any of the power supplies may provide more than one output voltage, for example a power supply may provide both positive and negative output voltages.

Each of the power supplies 11 to 16 is illustrated as also including an enable input E, which may also be referred to as an on/off control input or a shut-down input, and an adjust or trim input T. These inputs are connected to respective enable and trim outputs of the power supply controller 10. In addition, the output voltage of each of the power supplies 11 to 16 is connected to a respective one of six sense inputs of the power supply controller 10, for monitoring the respective supply voltages as further described below.

The power supply controller 10 is also illustrated as including a serial interface connection, for example a 2-wire interface for clock and data signals respectively, and may include further inputs and/or outputs, not shown in FIG. 1, for additional purposes for example as further described below.

As stated above, each of the power supplies 11 to 13 is in this example an isolating SMPS, in which the output of the power supply is electrically isolated from the input supply voltage provided by the input circuit 17. The VRMs 14 to 16 do not themselves provide electrical isolation, but are connected to the output of the power supply 12 and are thereby also electrically isolated from the input supply voltage. In order to maintain this electrical isolation, as indicated in FIG. 1 by a dotted line 18 representing an electrical isolation barrier, the power supply controller 10 comprises two parts which are electrically isolated from one another. For simplicity and convenience, and for consistency with the terminology for transformers used to provide electrical isolation in the isolating SMPSs 11 to 13, these two parts are referred to herein as primary and secondary sides of the power supply controller 10, the primary side being shown in FIG. 1 to the left of the isolation barrier line 18.

As shown in FIG. 1, the sense inputs of the power supply controller 10 are connected to the outputs of the power supplies 11 to 16 and are accordingly provided on the secondary side of the power supply controller 10, to the right of the dotted line 18. Similarly, the trim outputs are provided on the secondary side of the power supply controller 10 for connection to the trim inputs T of the power supplies 11 to 16 also on the output side of these power supplies. However, trim outputs of the power supply controller 10 may also be provided on the primary side of the power supply controller for connection to trim inputs provided on the primary or input side of some power supplies.

The enable inputs E of the power supplies 11 to 16 are typically provided on the input or primary side of these power supplies, as indicated in FIG. 1 by the position of the input E at the left of the respective power supply. For each SMPS 11 to 13 this is on the input side not isolated from the input circuit 17, whereas for each VRM 14 to 16 this is on the output side of the SMPS 12 and electrically isolated from the input circuit 17. In order to maintain electrical isolation, the enable outputs of the power supply controller 10 are duplicated so as to be on both of the primary and secondary sides. In each case the enable output used for the respective power supply is determined as the primary-side or secondary-side enable output according to whether or not the respective enable input E is isolated from the input circuit 17. This is represented in FIG. 1 by the enable outputs of the power supply controller 10 being on both sides of the isolation barrier 18, those on the left connecting to the enable inputs of the SMPSs 11 to 13 and those on the right being connected to the electrically isolated enable inputs of the VRMs 14 to 16.

Although this description assumes for convenience that the power supplies 11 to 16 provide electrical isolation of their output supply voltages from the input supply voltage received via the input circuit 17, and any such isolation is maintained by the power supply controller 10 accordingly, this need not necessarily be the case and any of the power supplies could instead provide a non-isolated path from the input circuit 17 to its output supply voltage.

It can be appreciated from the above description that the power supply controller 10 is connected via three paths, for enable, trim, and voltage sensing or monitoring, to each power supply. As described further below, the power supply controller 10 provides individual control of each power supply, independently of the others except as desired by any sequencing as described further below, and for example may include logic circuits providing a separate state machine for each power supply as further described below. In each case the trim connection path is optional and need not be provided. Any of the VRMs 14 to 16 may also not include an enable input E; in this case the respective enable connection path is not provided and the VRM is indirectly enabled as a result of enabling the SMPS from which the respective VRM receives its input supply voltage.

Thus it can be appreciated that the power supply controller 10 enables each of the power supplies 11 to 16 to have any of a variety of different forms and characteristics, as provided by any of a variety of manufacturers.

It is observed here that although for simplicity all of the output supply voltages are positive with respect to the ground or 0V line, any of them could instead be negative with respect to this line. Also, although for simplicity FIG. 1 shows this ground line as being connected commonly to the power supply controller 10 and each of the power supplies 11 to 16, this need not necessarily be the case and other arrangements can alternatively be provided.

It is also observed that the power supply arrangement can include supply voltage filtering components, and/or diodes or other components connected between different ones of the output supply voltage lines to limit voltage differences between such lines. These can be provided in known manner and for simplicity are not shown in FIG. 1.

Figure 2:
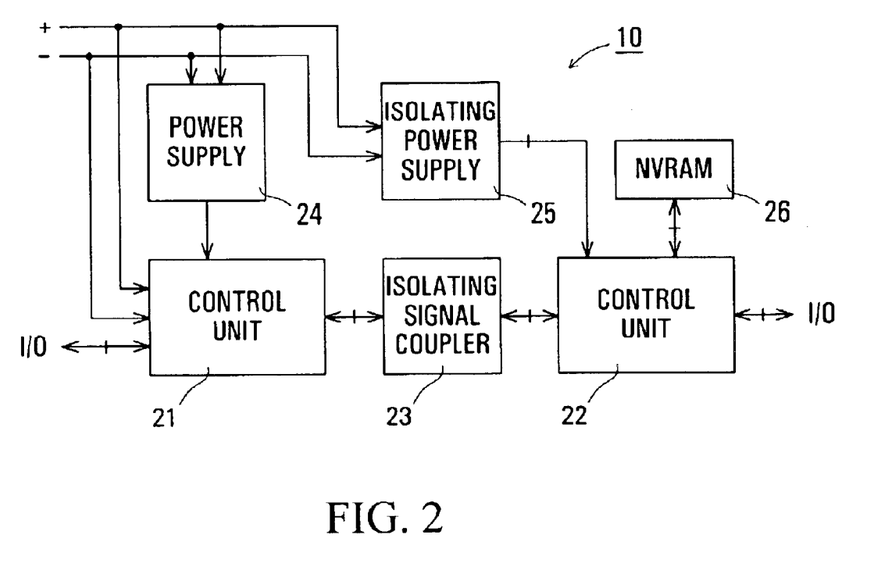
FIG. 2 illustrates a block diagram of a first form of the power supply controller of FIG. 1.

FIG. 2 illustrates a block diagram of a first form of the power supply controller 10 of FIG. 1, comprising a first control unit 21, a second control unit 22, an isolating signal coupler 23, a power supply 24, an isolating power supply 25, and a non-volatile random access memory (NVRAM) 26.

In the power supply controller of FIG. 2, the input supply voltage from the input circuit 17 (FIG. 1) is supplied to the first control unit 21 and to the power supplies 24 and 25, which provide supply voltages to the first and second control circuits 21 and 22 respectively. The coupler 23 provides electrically isolating coupling of signals in both directions between the first and second control units 21 and 22, and may comprise a transformer, opto-couplers, or other electrically isolating signal coupling devices. The electrical isolation provided by the signal coupler 23 and the isolating power supply 25 maintain the electrical isolation barrier between the primary and secondary sides of the power supply controller 10, as described above with reference to FIG. 1.

The NVRAM 26, which may be constituted for example by an electrically erasable programmable read-only memory (EEPROM), is provided on the secondary side of the power supply controller 10 and is illustrated as being coupled to the second control unit 22. FIG. 2 also illustrates input/output (I/O) lines connected to the first and second control units 21 and 22; these constitute the inputs and outputs of the power supply controller 10 on its primary and secondary sides, such as the ENABLE, TRIM, SENSE, SEAT, KEY, ground G, and serial interface connections shown in FIG. 1.

Figure 3:
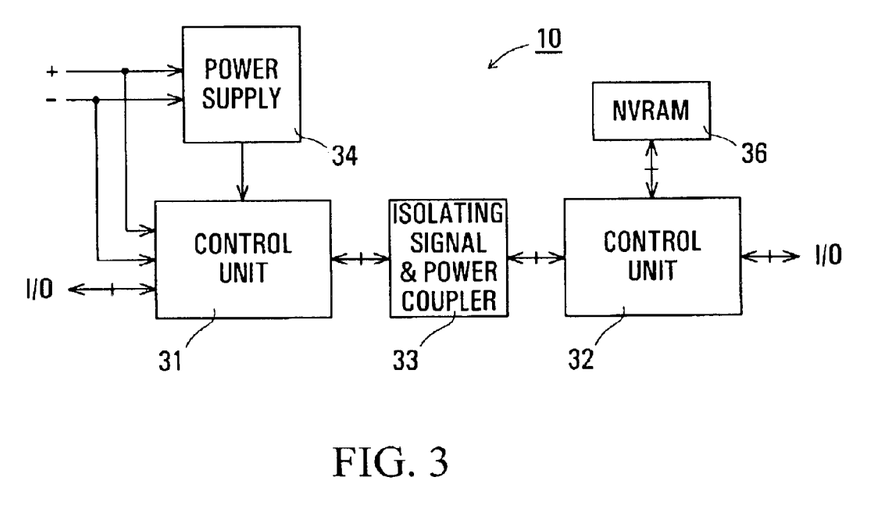
FIG. 3 illustrates a block diagram of another form of the power supply controller of FIG. 1.

FIG. 3 illustrates a block diagram of another form of the power supply controller 10 of FIG. 1, comprising units 31 to 34 and 36 which generally correspond to the units 21 to 24 and 26, respectively, of the power supply controller of FIG. 2. In the power supply controller 10 of FIG. 3, however, there is no separate isolating power supply corresponding to the power supply 25 in the power supply controller of FIG. 2. Instead, in the power supply controller 10 of FIG. 3 the coupler 33 is an isolating signal and power coupler which not only provides for bidirectional signal coupling between the first and second control units 31 and 32, but also couples power in an isolated manner in a direction from the first control unit 31 to the second control unit 32, this coupled power serving to supply operating power to the secondary side of the power supply controller 10, including the second control unit 32 and the NVRAM 36.

In the power supply controller 10 of FIG. 3 the isolating signal and power coupler 33 conveniently comprises a transformer for coupling signals and power for example as further described below, but it can alternatively comprise any other desired form of electrically isolating coupler(s) for coupling the power to the secondary side of the power supply controller, and for coupling signals in both directions between the primary and secondary sides of the power supply controller, either separately or in combination.

The operation of the forms of the power supply controller 10 illustrated in FIGS. 2 and 3 will be understood from the description below, in particular in relation to the more detailed functional block diagram in FIG. 4, which illustrates a further form of the power supply controller 10 based on the form shown by FIG. 3. However, it should be appreciated that the power supply controller 10 can also have other forms. For example, although as described here the NVRAM is provided on the secondary side of the power supply controller 10, and required information from this NVRAM is transferred to the primary side via the coupler 23 or 33, alternatively or in addition an NVRAM can be provided on the primary side of the power supply controller, required information being stored in it directly or, conveniently, via the secondary side of the power supply controller and via the isolating signal coupler.

Figure 4:
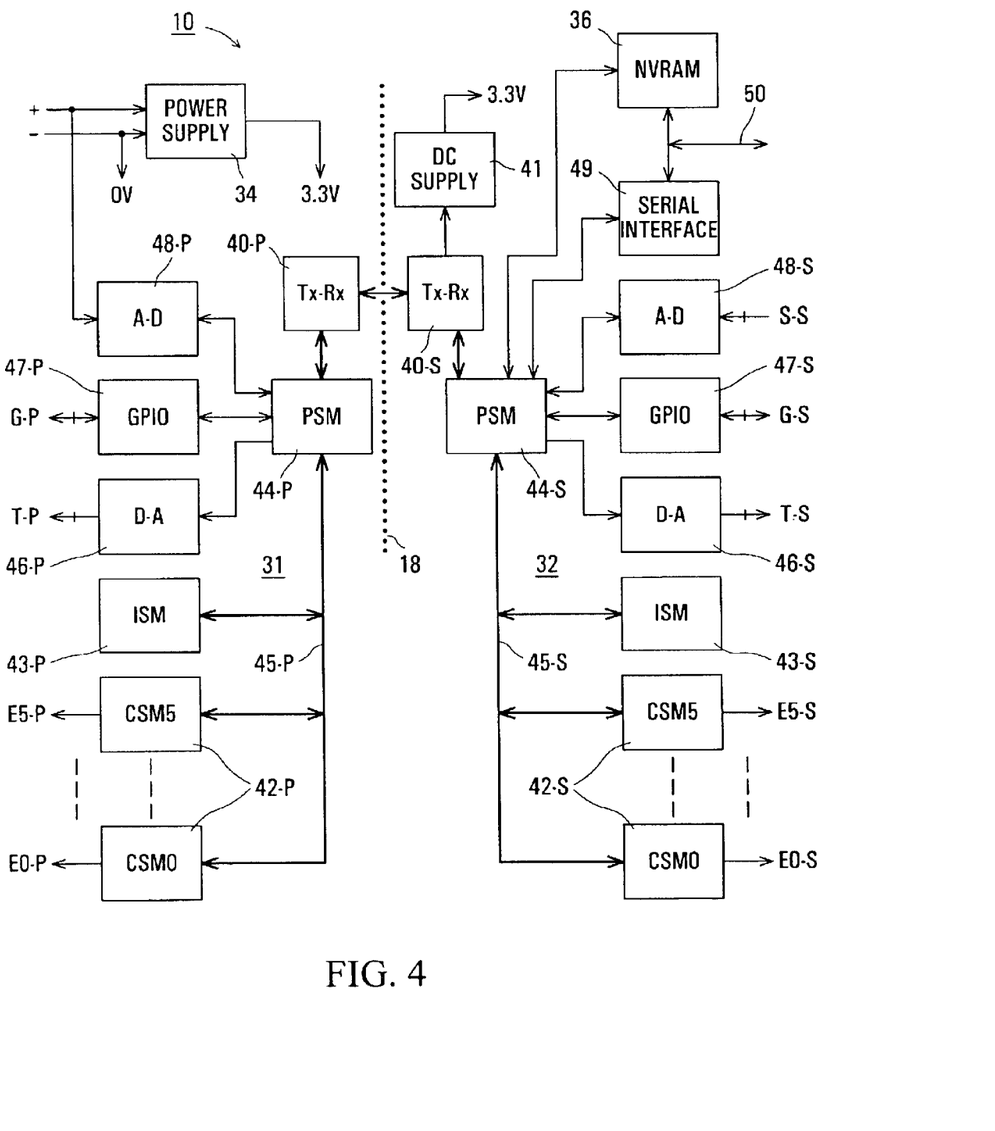
FIG. 4 illustrates in more detail a further form of the power supply controller of FIG. 1.

Referring to FIG. 4, the first and second control units 31 and 32 are illustrated in more detail to the left and right, respectively, of the isolation barrier 18. Transmit-receive (Tx-Rx) units 40 and a DC supply unit 41 together correspond to the isolating signal and power coupler 33 of FIG. 3. FIG. 4 also shows the power supply 34, which provides a 3.3 volt output for the primary side of the power supply controller 10, and further shows the NVRAM 36 on the secondary side. The DC supply unit 41 provides a 3.3 volt output for the secondary side of the power supply controller 10 including the NVRAM 36. It will be appreciated that, to maintain isolation, a ground or 0 volt path of the secondary side of the power supply controller, not shown in FIG. 4, is separate from the 0 volt path on the primary side of the power supply controller, which is constituted as illustrated by the negative supply voltage connection from the input circuit 17.

As illustrated in FIG. 4, each of the first and second control units 31 and 32 comprises in this example six converter state machines (CSMs) 42, referred to as CSM0 to CSM5 (only these two being shown, the others being indicated by a dashed line) and each provided for a corresponding one of the six power supplies 11 to 16 (FIG. 1) to be controlled; an input state machine (ISM) 43; and a power sequence manager (PSM) 44; these are coupled together for communications via a bus 45 shown by a bold line. As further shown in FIG. 4, the bus 45 is extended through the Tx-Rx units 40 for signal communications in both directions between the first and second control units 31 and 32.

By way of example, the bus 45 can be an 8-bit bus which is daisy-chained through all of the state machines and operated in a tdm (time division multiplex) manner with 8 time slots each allocated for communications from a respective state machine to the bus. Each state machine drives the bus with its own information during its allocated time slot, and in the other time slots can receive the information of the other state machines.

As further illustrated in FIG. 4, each of the first and second control units 31 and 32 also comprises a digital-to-analog converter (D-A) unit 46, a general purpose input/output (GPIO) unit 47, and an analog-to-digital converter (A-D) unit 48 which are illustrated as being coupled to the PSM 44. All of the components 40 and 42 to 48 are referenced in FIG. 4 with a suffix –P for the first control unit 31 on the primary side of the power supply controller 10 and –S for the second control unit 32 on the secondary side of the power supply controller.

The second control unit 32 also includes a serial interface unit 49, coupled to the PSM 44-S, for communications via a serial bus 50 with external equipment such as a computer (not shown). The serial bus 50 also provides for external programming and reading of the NVRAM 36.

The D-A unit 46-S in the second control unit 32 has a multiple-path output T-S, for providing analog adjust or trim signals each to a respective one of the six power supplies to be controlled; these correspond to the TRIM outputs on the secondary side of the power supply controller 10 as shown in FIG. 1. The D-A unit 46-P in the first control unit 31 similarly has a multiple-path output T-P, for providing analog trim signals each to a respective one of any of the power supplies to be controlled having a trim input on its primary side.

The GPIO unit 47-S in the second control unit 32 has a multiple-path input/output G-S, and the GPIO unit 47-P in the first control unit 31 similarly has a multiple-path input/output G-P, for receiving/providing binary signals on the secondary and primary sides of the power supply controller 10, respectively. Such signals can include the SEAT signal on the primary side and the KEY signal on the secondary side of the power supply controller 10, as discussed above.

The A-D unit 48-S in the second control unit 32 has a multiple-path input S—S, for receiving analog sense signals representing the monitored output voltages each of a respective one of the six power supplies to be controlled; these correspond to the SENSE inputs on the secondary side of the power supply controller 10 as shown in FIG. 1. As shown in FIG. 4 and as further described below, the A-D unit 48-P in the first control unit 31 monitors the input supply voltage from the input circuit 17 (FIG. 1), represented by the +voltage input relative to 0 volts represented by the –voltage input.

Each CSM 42-P or 42-S produces an enable output signal for the primary or secondary side, respectively, of the respective one of the power supplies to be controlled, represented as signals E0-P to E5-P on the primary side and E0-S to E5-S on the secondary side. These correspond to the ENABLE outputs on the respective sides of the power supply controller 10 in FIG. 1.

The first and second control units 31 and 32 can be conveniently implemented in ASICs (application-specific integrated circuits), and it will be appreciated from this description that a number of functions of the two control units are similar. ASICs constituting these control units can have individual designs for the two control units, or a single design of ASIC having different operating modes can be used for each of the first and second control units.

Before further describing the operation of the power supply controller of FIG. 4, examples of forms of the isolating signal and power coupler constituted by the units 40 and 41, and of the power supply 34, are further described below with reference to FIGS. 5 and 6 respectively.

Figure 5:
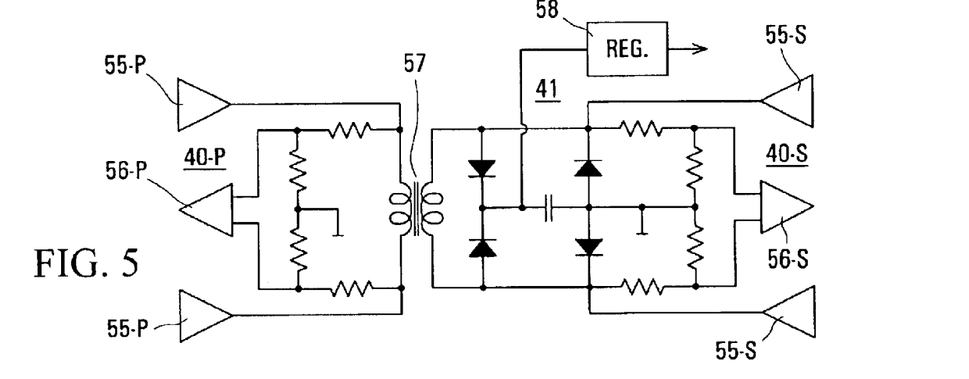
FIG. 5 schematically illustrates one form of an isolating signal and power coupler of the power supply controller of FIG. 3 or 4.

Referring to FIG. 5, the Tx-Rx units 40 on the primary and secondary sides of the power supply controller 10 are generally similar arrangements (again distinguished by suffixes –P and –S respectively) each comprising differential signal transmit buffers 55 and a differential signal receiver 56, which are coupled to the primary and secondary windings, respectively, of a transformer 57. The inputs of each receiver 56 are coupled to the respective transformer winding via resistive potential dividers to limit voltage swings at the receiver inputs.

In the arrangement of FIG. 5 the DC supply 41 is constituted by a diode bridge (in a synchronous arrangement, MOSFETs could be used instead of the diodes) connected to the secondary winding of the transformer 57, a smoothing capacitor, and a voltage regulator (REG.) 58. By way of example, with the primary side supply voltage of 3.3 volts as described above, the transformer 57 can have a primary to secondary turns ratio of 3:5, and the regulator 58 can provide a secondary side supply voltage also of 3.3 volts. 0 volt connections in FIG. 5 are also illustrated and are isolated from one another on the primary and secondary sides as described above. The transmit buffers 55-P on the primary side have sufficient drive capability to provide the power required by the secondary side, and for example Manchester code is used for the signals to provide equal drive of the transformer in both directions, thereby to avoid transformer saturation. Other coding methods can alternatively be used.

Figure 6:
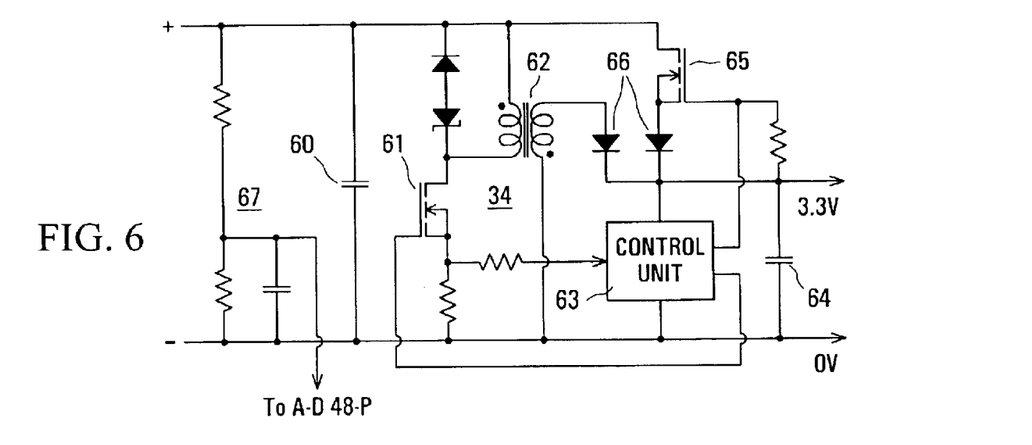
FIG. 6 schematically illustrates one form of a power supply of the power supply controller of FIG. 3 or 4.

Referring to FIG. 6, the power supply 34 comprises a current mode flyback power supply including an input capacitor 60, a switching transistor 61, a transformer 62, a control unit 63, and an output capacitor 64. A start-up circuit is provided by a depletion mode MOSFET 65, a supply voltage of 3.3 volts for the power supply control unit 63 and the first control unit 31 being derived from either the start-up circuit or the flyback power supply via a respective one of two diodes 66. The control unit 63 has an output for controlling the switching transistor 61 in dependence on current in the source circuit of the transistor 61, and has another output for turning off the depletion mode transistor 65 when the flyback supply is operating.

FIG. 6 also shows an input potential divider and smoothing capacitor circuit 67, which derives and supplies to the A-D unit 48-P as described above a voltage representing the input supply voltage from the input circuit 17 (FIG. 1), the input supply voltage being referred to below as a voltage Vin.

When a circuit card, containing the power supply controller 10 and power supplies controlled thereby, is inserted into a socket and connects to a connector of a live backplane, the input voltage vin supplied via the input circuit 17 initially rises from zero volts as capacitors, such as the capacitor 60 of the power supply 34, charge. The power supply control unit 63 and the first control circuit 31 are supplied with the primary side supply voltage via the start-up depletion mode transistor 65 which provides a relatively low current, and the first control circuit 31 is initialized. As the input voltage continues to rise, the power supply control unit 63 controls the power supply 34 so that the primary side supply voltage is supplied by the higher power flyback supply. The PSM (power sequence manager) 44-P then drives the Tx-Rx unit 40-P to power up the second control unit 32 and NVRAM 36 via the transformer 57 and the DC supply 41 (the power supply control unit 63 can be part of the PSM 44-P, or can communicate its state to the PSM 44-P by a path not shown).

The input voltage Vin is monitored by the A-D unit 48-P, and the SEAT input is monitored by the GPIO unit 47-P, information accordingly being communicated by the PSM 44-P and the bus 45-P to the ISM (input state machine) 43-P and also via the Tx-Rx units 40 and the PSM 44-S and bus 45-S to the ISM 43-S. Similar communications of signals in both directions between the buses 45 via the PSMs 44 and Tx-Rx units 40 maintain synchronism of the ISMs 43 in the first and second control units.

In a similar manner, synchronism is established on power-up and is maintained between the CSMs (converter state machines) CSM0 to CSM5 42-P of the first control unit 31 and the CSMs CSM0 to CSM5, respectively, 42-S of the second control unit 32. Initially, each CSM 42 provides an enable output which (if connected) disables the corresponding controlled power supply. A polarity for the enable signal of each controlled power supply can be provided by further inputs (not shown) to the CSMs 42.

In the second control unit 32, the output voltage of each controlled power supply is monitored by the A-D unit 48-S, and the KEY input is monitored by the GPIO unit 47-S, information accordingly being communicated by the PSM 44-S to the respective CSMs 42 in the first and second control units.

The NVRAM 36 stores information relating to the input voltage Vin and the sequencing and parameters of the various controlled power supplies 11 to 16. On power-up and initialization of the power supply controller 10, this information is transferred from the NvRAM 36 via the PSMs 44, Tx-Rx units 40, and buses 45 to shadow registers for the respective state machines, i.e. the CSMs 42 and the ISMs 43, to be used in operation of the power supply controller 10. This transfer of information to the shadow registers enables the information from the NVRAM 36 to be used at the operating speed of the control units 31 and 32.

By way of example, for the input voltage Vin, for the primary side ISM 43-P this information can include a card seat period during which the SEAT signal must be maintained to ensure that the circuit card is seated, and a threshold voltage and related period which must be exceeded by the input voltage Vin for a power-up sequence of the controlled power supplies to begin; and for the secondary side ISM 43-S this information can include a KEY signal to be matched and a related period for this to be maintained, and a fault period which must have expired following any previous fault causing a power-down of the controlled power supplies. When the conditions implied by this information are satisfied as determined by the ISMs 43-P and 43-S and the communications between them, the CSMs 42 are enabled to begin a power-up sequence for the controlled power supplies.

The stored information for the input voltage Vin can also include, for example, voltage thresholds or ranges, and associated time periods, which can be used by the ISMs 43 to detect faults of the input voltage Vin and thereby to cause a power-down of the controlled power supplies.

Also by way of example, the information stored in the NVRAM 36 for each CSM 42 and its controlled power supply can include parameters such as the following. As this information relates to the monitored output voltage of the controlled power supply, and associated time periods, it is used by the respective secondary side CSM 42-S and need not be shadowed for the primary side CSM 42-P. The communications via the buses 45, PSMs 44, and Tx-Rx units 40 provide for maintaining the CSMs 42-P in synchronism with the CSMs 42-S, and in particular for replicating the enable output of each CSM 42-S in the corresponding CSM 42-P:

- start-up, shut-down, and fault identifiers each of another state machine which precedes the respective state machine in a power-up, normal shut down, and fault shut-down sequence respectively, and associated time delay periods;
- under- and over-voltage thresholds and associated time periods for triggering warnings and detecting fault conditions in normal operation of the controlled power supply;
- an over-voltage threshold and associated time period for start-up of the controlled power supply, and a mask time period for start-up to be completed before under-voltage monitoring takes effect;
- a start-up voltage threshold which must be exceeded to trigger a subsequent CSM in the power-up sequence of the controlled power supplies; and
- a restart voltage threshold below which the monitored voltage must fall before a power-up sequence is initiated following a shut-down of the controlled power supplies.

The information stored in the NVRAM 36 can include further information as may be desired and, in particular, may include voltage parameters for both the primary and secondary side CSMs relating to the adjustment or trimming of the controlled power supplies, via the associated D-A units 46.

As stated above, the information discussed above is given only by way of example of information that can be stored in the NVRAM 36 and transferred to shadow registers for the state machines, and in different applications other or different information may be stored and used instead.

Figure 7:
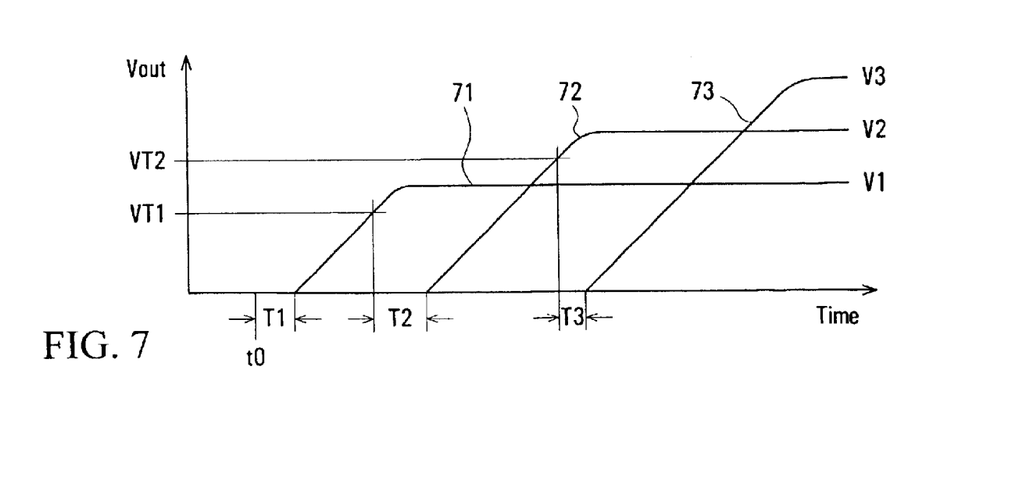
FIG. 7 is a diagram illustrating sequencing of power supplies controlled by the power supply controller.

FIG. 7 is a graph of output voltage Vout as a function of time, illustrating a power-up sequence of three controlled power supplies controlled by the power supply controller 10 using information such as that discussed above. In FIG. 7, by way of example, the three controlled power supplies produce respective output voltages V1, V2, and V3 in a power-up sequence of increasing output voltage, as shown by lines 71, 72, and 73 respectively for the output voltages of the three controlled power supplies.

In FIG. 7, it is assumed that the ISMs 43 determine that all of the applicable conditions for initiating a power-up sequence are satisfied at a time t0; thus as discussed above the input voltage Vin has exceeded its threshold for the prescribed period and is stable, and the other conditions such as the SEAT and KEY signals, fault period expiry, and so on are satisfied. A further condition in this respect is that the output voltage of each controlled power supply is less than the restart voltage threshold for that controlled power supply.

The controlled power supply for the output voltage V1 is identified as the first in the power-up sequence by having its start-up identifier identifying the ISMs 43 or the input voltage Vin. It has a start-up delay period T1 which is timed from the time t0, after which its primary side CSM 42-P produces an enable signal to enable this power supply, and its output voltage rises as shown by the line 71. When this output voltage exceeds the start-up voltage threshold VT1 for this controlled power supply, as determined by the associated secondary side CSM 42-S, this CSM provides via the buses 45 a trigger for the next CSM in the power-up sequence.

The controlled power supply for the output voltage V2 is identified as the next in the power-up sequence by having its start-up identifier identifying the CSMs 42 for the controlled power supply producing the output voltage v1. It has a start-up delay period T2, on the expiry of which its primary side CSM 42-P produces an enable signal to enable this power supply, and its output voltage rises as shown by the line 72. When this output voltage exceeds the start-up voltage threshold VT2 for this controlled power supply, as determined by the associated secondary side CSM 42-S, this CSM provides via the buses 45 a trigger for the next CSM in the power-up sequence.

Similarly, the controlled power supply for the output voltage V3 is identified as the next in the power-up sequence by having its start-up identifier identifying the CSMs 42 for the controlled power supply producing the output voltage V2. It has a start-up delay period T3, on the expiry of which its primary side CSM 42-P produces an enable signal to enable this power supply, and its output voltage rises as shown by the line 73.

Monitoring of the output voltages of the various controlled power supplies is carried out in normal operation by the CSMs 42-S, with trim adjustments optionally provided by the CSMs 42-S and/or the CSMs 42-P as discussed above. The ISM 43-P similarly monitors the input voltage Vin. In the event of a fault, or a power shut-down command (which may for example be provided via the serial interface 49), a fault or normal shutdown sequence is followed by the state machines in a similar manner in accordance with the information stored in the NVRAM 36 and transferred to the shadow registers for use by the state machines as described above.

It can be appreciated that the power supply controller can also provide for communications between the control units 31 and 32 of signals other than those described above. For example, light indicators can be provided controlled by the first control unit 31 to indicate initial presence of the source voltage Vin and subsequently, in response to monitoring by the second control unit 32 and signalling to the first control unit 31, correct operation of the controlled power supplies. Other signals can be provided and coupled between the control units 31 and 32 for other purposes, for example for monitoring operating status, input current, or for monitoring on the secondary side total power consumption on the circuit board for communication to the primary side for use for thermal management purposes.

Such signals can also include information constituting a log of faults which occur in operation; for example such faults may include faults of the input voltage Vin, as monitored by the first control unit 31, and faults of each of the controlled power supplies 11 to 16, as monitored by the second control unit 32. Accordingly, each of the first and second control units can maintain full information relating to the status of the power supply arrangement. Desirably, this information for both of the primary and secondary sides is also stored in normal operation in the NVRAM 36, enabling it to be accessed via the serial interface bus 50 to facilitate fault diagnosis.

Thus the power supply controller provides not only a flexible configuration for various types and numbers of controlled power supplies, but also a variety of advantageous features by virtue of its signal coupling between the first and second control units.

Although in the above description the ISM and CSMs in each of the first and second control units are described in the form of state machines in an ASIC, it can be appreciated that these can be implemented in any other desired manner, for example as multiplexed processes of a microcontroller.

Although in the embodiments of the invention described above signals are coupled in both directions between the first and second control units, it is conceivable that the power supplies could be controlled only by the first control unit, signals (e.g. relating to the monitored output voltages of the controlled power supplies) being coupled in only one direction from the second control unit to the first control unit. However, such an arrangement is not preferred because it would not, for example, permit control (enabling) of any power supplies by the second control unit as described above.

Thus although particular embodiments of the invention and examples have been described above in detail, it can be appreciated that numerous modifications, variations, and adaptations may be made without departing from the scope of the invention as defined in the claims.

What is claimed is:

1. A power supply controller for controlling a plurality of power supplies each for producing a respective output voltage from an input voltage, the controller comprising:
   a first control unit arranged for monitoring the input voltage and for controlling the power supplies, the first control unit having a voltage supply derived from the input voltage;
   a second control unit arranged for monitoring the output voltages of the power supplies, the second control unit having a voltage supply derived in an isolated manner from the input voltage; and
   an isolating signal coupler for coupling signals, related to the control of the power supplies, in an isolated manner from the second control unit to the first control unit.

2. A power supply controller as claimed in claim 1 wherein the voltage supply for the second control unit is derived via the first control unit and the isolating signal coupler.

3. A power supply controller as claimed in claim 1 wherein the isolating signal coupler couples signals in an isolated manner in both directions between the first and second control units.

4. A power supply controller as claimed in claim 3 wherein the voltage supply for the second control unit is derived via the first control unit and the isolating signal coupler.

5. A power supply controller as claimed in claim 3 wherein each of the first and second control units includes outputs for enabling or disabling respective ones of the controlled power supplies.

6. A power supply controller as claimed in claim 3 wherein the second control unit includes outputs for adjusting the monitored output voltages of the controlled power supplies.

7. A power supply controller as claimed in claim 3 wherein the first control unit includes outputs for adjusting the monitored output voltages of the controlled power supplies.

8. A power supply controller as claimed in claim 3 and including a non-volatile store for storing information relating to controlling the power supplies.

9. A power supply arrangement comprising a power supply controller as claimed in claim 8 and a plurality of controlled power supplies arranged to be controlled by the power supply controller.

10. A power supply controller for controlling a plurality of controlled power supplies, comprising:
    a first control unit for monitoring an input voltage of the controlled power supplies and for providing enable outputs for enabling or disabling respective controlled power supplies;
    a first power supply unit for deriving a power supply voltage for the first control unit from the input voltage;
    a second control unit for monitoring output voltages of the controlled power supplies;
    a second power supply unit for deriving a power supply voltage for the second control unit from the input voltage in an electrically isolated manner; and
    an electrically isolating signal coupler for coupling signals in both directions between the first and second control units;
    wherein the first and second control units are responsive to the monitored input voltage and the monitored output voltages for controlling the enable outputs to enable or disable the controlled power supplies.

11. A power supply controller as claimed in claim 10 and including a non-volatile store, coupled to the second control unit, for storing information relating to a desired sequence, wherein the first and second control units are responsive to the monitored input voltage and the monitored output voltages for controlling the enable outputs to enable or disable the controlled power supplies in the desired sequence.

12. A power supply controller as claimed in claim 10 wherein the second power supply unit is arranged to derive power for the second control unit from the first power supply unit via the first control unit and the electrically isolating signal coupler.

13. A power supply controller as claimed in claim 12 wherein the electrically isolating signal coupler comprises a transformer.

14. A power supply controller as claimed in claim 10 wherein the second control unit also includes outputs for enabling or disabling respective controlled power supplies.

15. A power supply controller as claimed in claim 10 wherein the second control unit includes outputs for adjusting the output voltages of controlled power supplies.

16. A power supply controller as claimed in claim 10 wherein the first control unit includes outputs for adjusting the output voltages of controlled power supplies.

17. A power supply arrangement comprising a power supply controller as claimed in claim 10 and a plurality of controlled power supplies arranged to be controlled by the power supply controller.

18. A power supply controller for controlling a plurality of isolating power supplies, each for converting an input voltage to one or more respective output voltages, for power-up or shut-down in a desired sequence, the power supply controller comprising:
    a first control unit powered from the input voltage and having outputs for enabling the isolating power supplies via an input on a primary side of each isolating power supply, the first control unit being arranged to monitor the input voltage;

a second control unit powered from the input voltage in an isolated manner and arranged to monitor the output voltage of each isolating power supply; and an isolating signal coupler between the first and second control units;

the control units together being responsive to the monitored input voltage and the monitored output voltages so that the first control unit enables the isolating power supplies in accordance with the desired power-up or shut-down sequence.

19. A power supply controller as claimed in claim 18 wherein the second control unit is powered from the input voltage via the first control unit and the isolating signal coupler.

20. A power supply controller as claimed in claim 18 and including a non-volatile store, coupled to the second control unit, for storing information relating to the desired power-up or shut-down sequence.

21. A power supply controller as claimed in claim 20 wherein the control units are responsive to the monitored input voltage and the monitored output voltages to store information relating to detected faults of the monitored voltages in the non-volatile store.

22. A power supply controller as claimed in claim 20 wherein the second control unit and the non-volatile store are powered from the input voltage via the first control unit and the isolating signal coupler.

23. A power supply controller as claimed in 18 wherein the second control unit is also arranged to monitor an output voltage of at least one non-isolating power supply having an input voltage constituted by an output voltage of one of the isolating power supplies, and the second control unit also includes an output for enabling or disabling the non-isolating power supply in accordance with the desired power-up or shut-down sequence.

24. A power supply controller as claimed in claim 18 wherein the second control unit includes outputs for adjusting the output voltages of the power supplies.

25. A power supply controller as claimed in claim 24 wherein the first control unit also includes outputs for adjusting the output voltages of the power supplies.

26. A power supply controller as claimed in claim 24 wherein the second control unit also includes outputs for enabling or disabling respective controlled power supplies.

27. A power supply arrangement comprising a power supply controller as claimed in claim 18 and a plurality of isolating power supplies arranged to be controlled by the power supply controller.

* * * * *